United States Patent
Yanagida et al.

(10) Patent No.: US 7,286,044 B2
(45) Date of Patent: Oct. 23, 2007

(54) POWER LINE COMMUNICATION DEVICE FOR VEHICLE

(75) Inventors: Yo Yanagida, Shizuoka-ken (JP); Terumitsu Sugimoto, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 256 days.

(21) Appl. No.: 10/652,202

(22) Filed: Sep. 2, 2003

(65) Prior Publication Data

US 2004/0207262 A1 Oct. 21, 2004

(30) Foreign Application Priority Data

Sep. 3, 2002 (JP) ............ P 2002-257569

(51) Int. Cl.
 *H04M 1/30* (2006.01)
(52) U.S. Cl. ............ 340/310.11; 340/538; 340/825.22; 340/3.1; 340/5.72; 307/10.1
(58) Field of Classification Search ............... 340/310.01–310.03, 310.06; 307/10.1, 3
 See application file for complete search history.

(56) References Cited

U.S. PATENT DOCUMENTS

| | | | | |
|---|---|---|---|---|
| 4,344,066 A | * | 8/1982 | Beggs | 340/310.03 |
| 5,031,082 A | * | 7/1991 | Bierend | 362/233 |
| 5,142,278 A | * | 8/1992 | Moallemi et al. | 340/436 |
| 5,485,040 A | * | 1/1996 | Sutterlin | 307/3 |
| 6,229,434 B1 | * | 5/2001 | Knapp et al. | 340/310.16 |
| 6,549,120 B1 | * | 4/2003 | de Buda | 340/310.01 |
| 6,667,685 B2 | * | 12/2003 | Wasaki et al. | 340/10.03 |
| 6,842,108 B2 | * | 1/2005 | Akiyama et al. | 340/310.11 |
| 2002/0030403 A1 | * | 3/2002 | Lesesky et al. | 303/122.02 |

FOREIGN PATENT DOCUMENTS

JP 08-098277 * 4/1996

* cited by examiner

*Primary Examiner*—Benjamin C. Lee
(74) *Attorney, Agent, or Firm*—Finnegan, Henderson, Farabow, Garrett & Dunner, L.L.P.

(57) ABSTRACT

A power line communication device for a vehicle is provided with an internal electronic control unit connected to a connection point on a power line, which communicates with an external electronic control unit by a communication signal superimposed on a supply voltage applied to the power line, and an impedance element inserted between the connection point and an external load. The impedance element suppresses attenuation of the communication signal.

10 Claims, 6 Drawing Sheets

US 7,286,044 B2

POWER LINE COMMUNICATION DEVICE FOR VEHICLE

BACKGROUND OF THE INVENTION

1. Field of the Invention

The present invention relates to a power line communication device for a vehicle, which superimposes various signals on a power line so as to establish communication between devices equipped in the vehicle.

2. Description of the Related Art

These days, many technical advantages are offered to vehicles and therefore a vehicle has a plurality of electronic control units (hereinafter called "ECU") on board. The ECUs control power windows, lamps and side mirrors as well as an engine and a transmission. The ECUs are connected with each other via private signal lines or common data buses and communicate with each other so that the ECUs operate cooperatively with each other.

Recently, the signal lines interconnecting the ECUs have been increased because the number of the ECUs has become larger and the number of signals has become larger due to complicated control. Thereby a structure of a wiring harness for a vehicle has become complex.

For solving the problem, a related art in which signals are superimposed on a supply voltage supplied to the respective ECUs via power lines so as to establish communication is disclosed in Japanese Patent Application Laid-open H07-50619.

SUMMARY OF THE INVENTION

FIG. 1 shows a general constitution of a proposed ECU. In the proposed ECU 100, a supply voltage for a vehicle, 12 V for example, supplied via a ECU power line 102 to which a bypass capacitor 101 is connected so as to suppress voltage variation, is changed into an operation voltage of electronic devices within the vehicle, 5V for example, by means of a power source circuit part 103 composed of a regulator and supplied to a computing part 104 composed of a CPU and such. The computing part 104 operates with the supply voltage supplied by the power source circuit part 103 and sends load control signals to a load control part 105. The load control part 105 composed of a switching element such as a relay is switching-controlled on the basis of the load control signals sent by the computing part 104 and controls drive current sent to loads via a load power line 106. A load 107 such as a drive motor for a power window, a side mirror and such and a lamp is driven by the drive current given via the load control part 105 from the load power line 106. A power line communication device 108 for a vehicle (hereinafter called "PLC") which superimposes signals on the supply voltage applied to the load power line 106 so as to communicate between the respective ECUs is connected with the ECU power line 102 and the load power line 106.

According to the proposed ECU, when the load 107 operates, the load 107 and the load power line 106 are directly coupled via the load control part 105. Thereby a noise, for example, a brush noise made by a motor of the side mirror, generated by the load 107 when operating, is directly input to the PLC 108 via the load power line 106. Thereby the input noise influences the signals sent and received between the respective ECUs and causes communication errors. This causes a problem of increasing a communication error rate (a bit error rate) and such.

Furthermore, the motor for the power window may be equipped with a capacitor 109 for noise reduction. In this case, the signals superimposed on the load power line 106 are sent to a side of the load 107 via the load control part 105. The capacitor 109 attenuates the signal level so as to cause a problem that communication becomes unstable.

The present invention is achieved in light of the above problems and objects thereof are to stabilize communication which is established by signals superimposed on a supply voltage for a vehicle and to provide a power line communication device for a vehicle, which achieves an improvement in communication quality.

According to a first aspect of the present invention, a power line communication device for a vehicle is provided with an internal electronic control unit connected to a connection point on a power line, which communicates with an external electronic control unit by a communication signal superimposed on a supply voltage applied to the power line, and an impedance element inserted between the connection point and an external load. Preferably, the impedance element is provided with a coil. Further preferably, the impedance element is provided with a coil and a capacitor connected with the coil. More preferably, the communication signal is amplitude-shift-key modulated.

DETAILED DESCRIPTION OF THE PREFERRED EMBODIMENT

Figure 1:
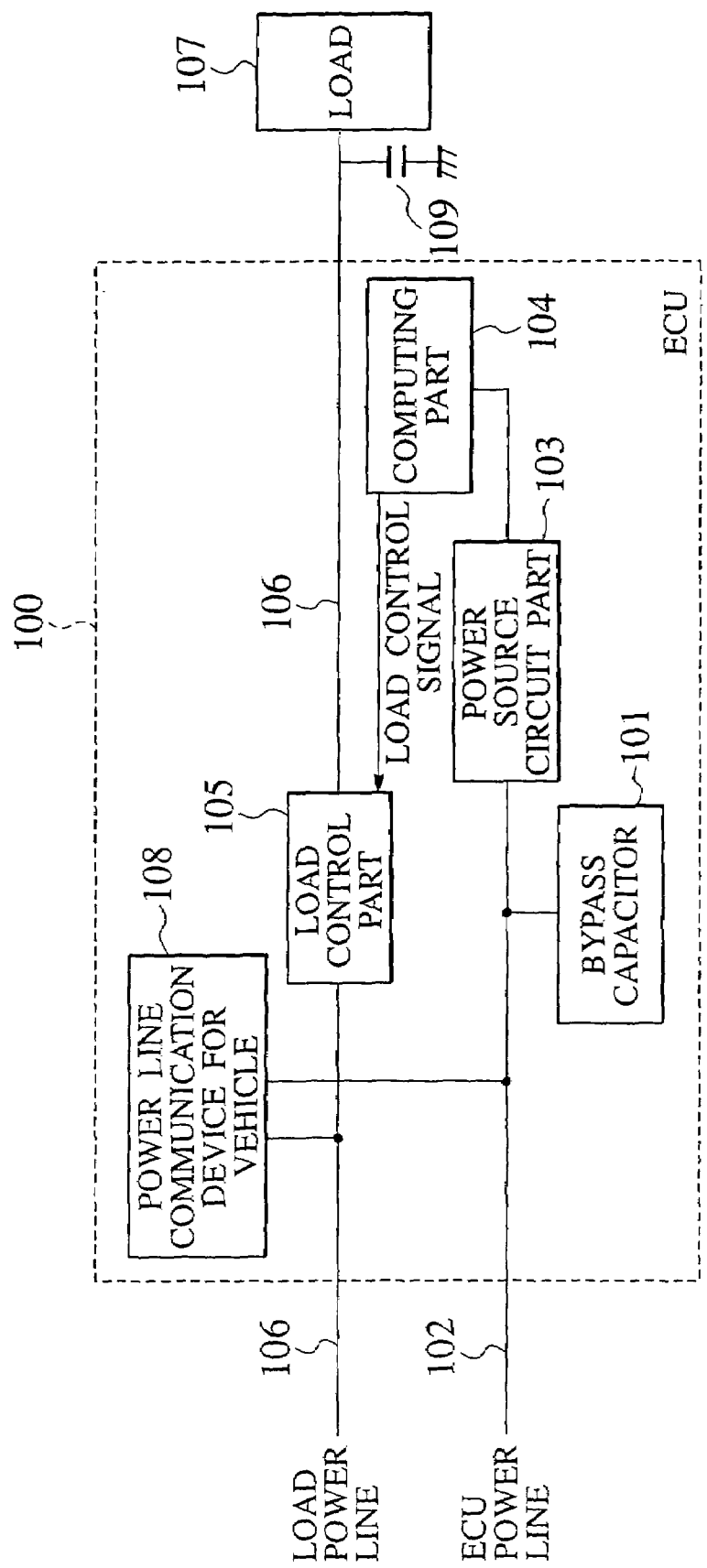
FIG. 1 is a block diagram of an electronic control unit provided with a proposed power line communication device for a vehicle.
Figure 2:
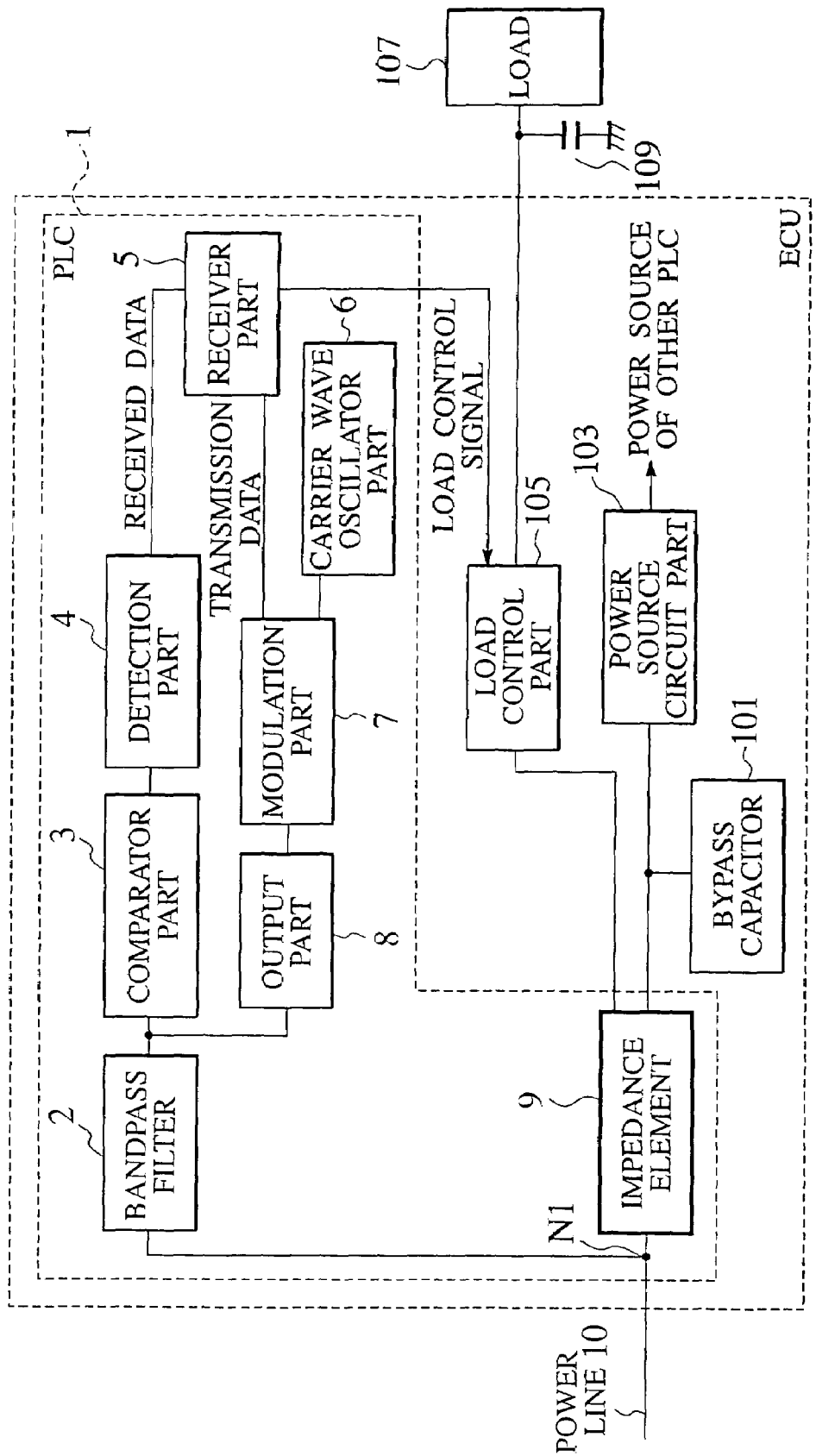
FIG. 2 is a block diagram of an electronic control unit provided with a power line communication device for a vehicle according to an embodiment of the present invention.

FIG. 2 is a block diagram of an ECU including a power line communication device for a vehicle (hereinafter called "PLC") according to an embodiment of the present invention. The PLC 1 included in the ECU is provided with a bandpass filter 2, a comparator part 3, a detection part 4, a receiver part 5, a carrier oscillator part 6, a modulation part 7, an output part 8 and an impedance element 9.

A bypass capacitor 101, a power source circuit part 103 and a load control part 105 included in the ECU, as well as a load 107 and a capacitor 109 for noise reduction, connected with the load 107, have the same functions as the above proposed ECU and detailed description will be omitted.

Signals which are superimposed on a supply voltage applied to a power line 10 so as to establish communication with the other ECUs are input into the bandpass filter 2. Noise components of low frequencies and high frequencies are filtered out of the input signals by means of the bandpass filter 2. The signals, whose noise has been filtered out, are sent to the comparator part 3. The signals communicating between the respective ECUs are digital signals which are amplitude-shift-key-modulated into a high frequency as described later and are transmitted on the power line 10.

The signals from the bandpass filter 2 are input into the comparator part 3. The comparator part 3 compares the modulated signals to a predetermined standard level so as to amplify the input signals. The amplified signals are sent to the detection part 4.

The signals sent by the comparator part 3 are input into the detection part 4. The detection part 4 detects the signals amplified by the comparator part 3 so as to extract the signals superimposed on the supply voltage applied to the power line 10 as received data. The extracted received data are sent to the receiver part 5.

The receiver part 5 which is composed of, for example, a CPU achieves various processings on the basis of the received data. As one of the processings, the receiver part 5 generates a load control signal for controlling the load control part 105. The generated load control signal is sent to the load control part 105 so that the load control part 105 are controlled in a similar manner with the proposed ECU. Furthermore, the receiver part 5 generates transmission data to be transmitted to the other ECUs. The generated transmission data are sent to the modulation part 7.

The carrier oscillator part 6 oscillates a carrier for superimposing the transmission data on the supply voltage applied to the power line 10. The oscillated carrier is sent to the modulation part 7.

The transmission data generated by the receiver part 5 and the carrier oscillated by the carrier oscillator part 6 are input into the modulation part 7. The modulation part 7 modulates the transmission data in an amplitude shift keying (hereinafter called "ASK") manner. The ASK modulated transmission data are sent to the output part 8.

In a case where the carrier is a low frequency wave, for example, in a range from several hundreds Hz to several kHz, the signals are greatly attenuated by means of the bypass capacitor with which an electronic device connected to the power source is equipped. Therefore it is preferred to ASK-modulate the communication signals with a high frequency wave of several MHz (for example, 2.5 MHz). The signals are ASK-modulated with the high frequency wave, thereby attenuation of the communication signals is suppressed and the power line communication can be stably achieved. A circuit constitution for the ASK-modulation can be more simple than that of other modulation methods.

The transmission data sent by the modulation part 7 are input to the output part 8. The output part 8 amplifies the ASK-modulated transmission data and outputs them to the power line 10 via the bandpass filter 2.

The impedance element 9 is an electric element having a higher impedance against a current component other than a direct current component and is composed of a proper combination of coils and/or capacitors. The impedance element 9 is inserted between a connection point N1 which is an input part of the PLC 1 and the power source circuit part 103 as well as the load control part 105 so as to control a conduction thereof. The impedance element 9 is constituted such as FIG. 3 or FIG. 4, for example.

Figure 3:
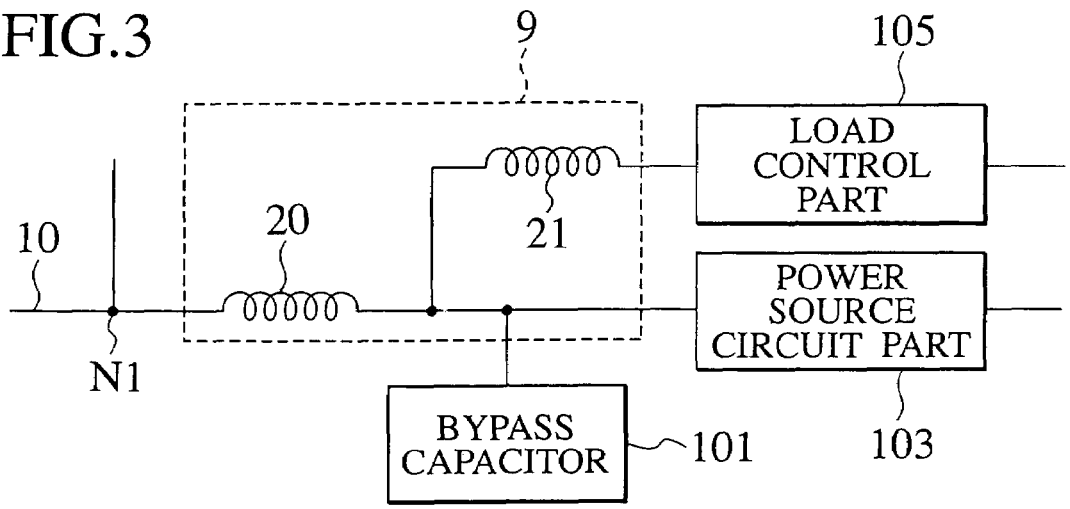
FIG. 3 is a block diagram of an impedance element included in the power line communication device.

The impedance element 9 shown in FIG. 3 is preferably applied to a case where a capacitor for noise reduction is connected with the load. The impedance element 9 is composed of a coil 20 and a coil 21. An end of the coil 20 is connected with the connection point N1 to which the bandpass filter 2 and the power line 10 are connected. An opposite end of the coil 20 is connected with an input side of the bypass capacitor 101 and the power source circuit part 103. An end of the coil 21 is connected with the coil 20 and an opposite end is connected with the load control part 105.

Figure 4:
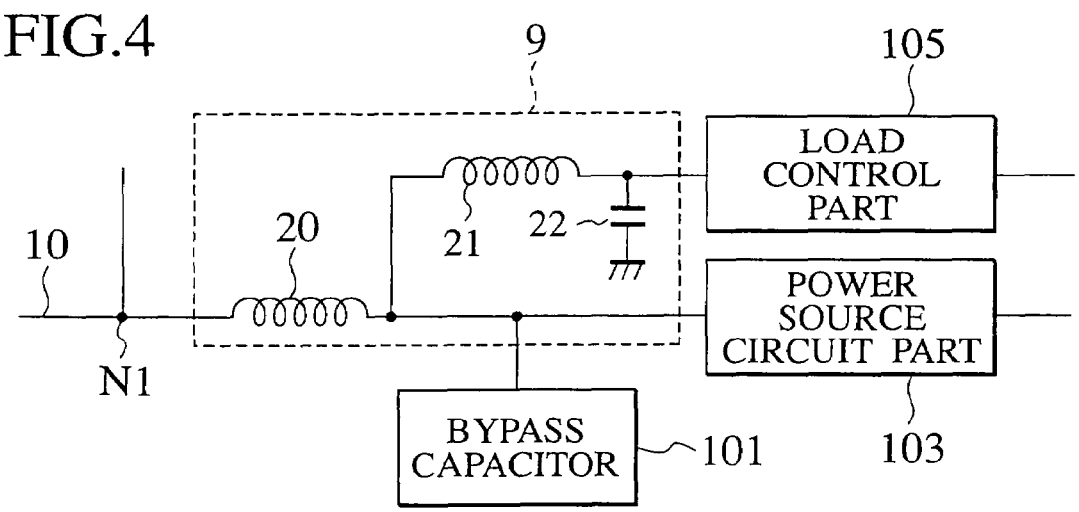
FIG. 4 is a block diagram of a modification of the impedance element.

FIG. 4 shows a modified example of the impedance element 9 in which a grounded capacitor 22 is further connected with the opposite end of the coil connected with the load control part 105 compared with the constitution shown in FIG. 3.

Figure 5:
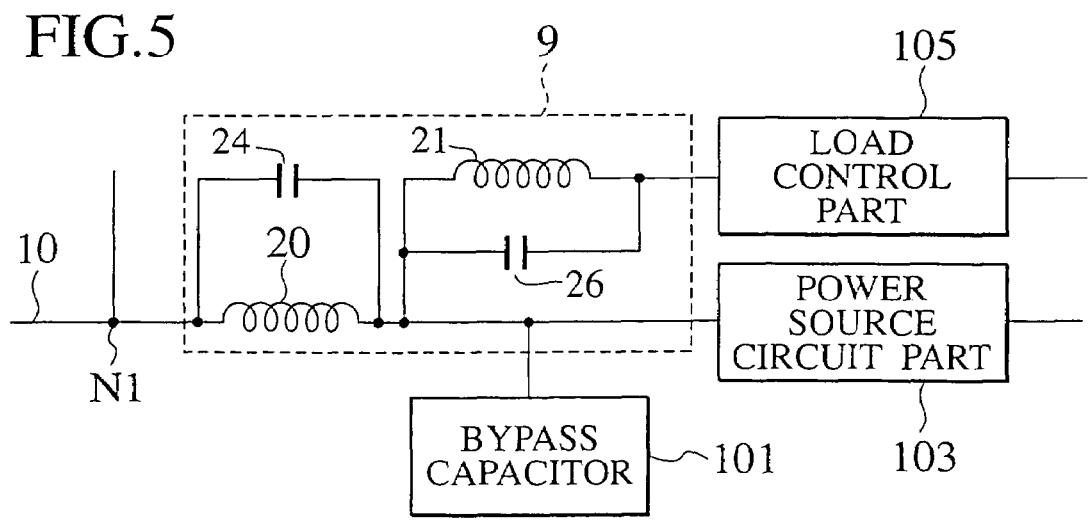
FIG. 5 is a block diagram of a second modification of the impedance element.
Figure 6:
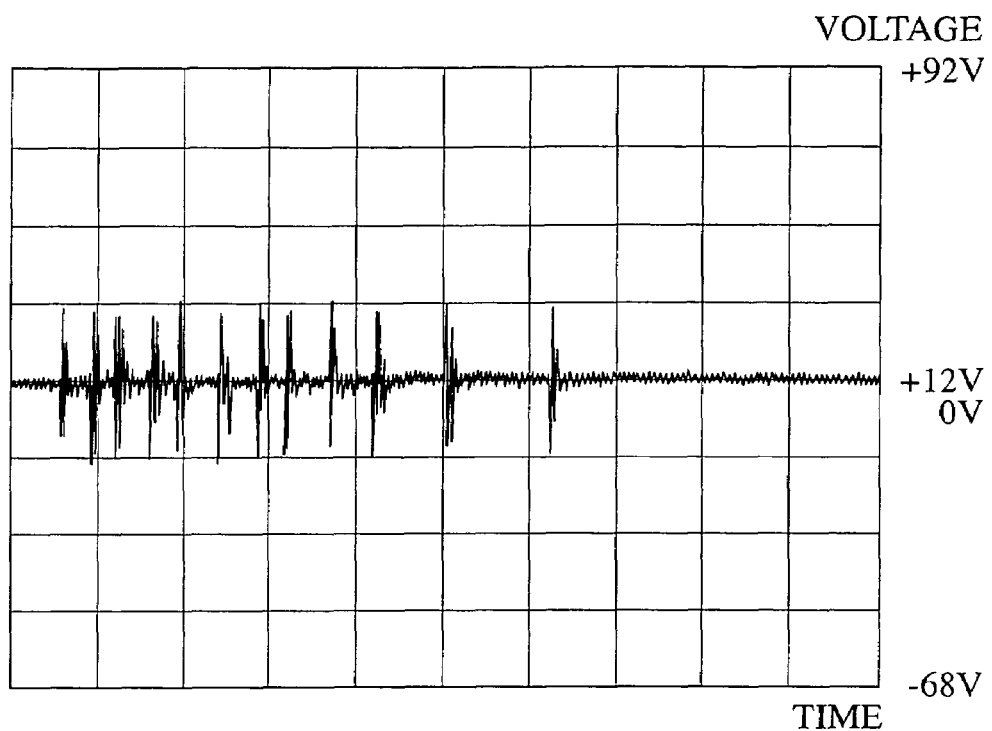
FIG. 6 is a comparative example of a supply voltage variation on a power line, in a case where a motor noise is superimposed thereon.

FIG. 5 shows a second modified example of the impedance element 9. Capacitors 24 and 26 are respectively connected in parallel with the coils 20 and 21. A substantial element size can be made smaller compared with the examples shown in FIGS. 3 and 4 while having a similar effect with their cases.

According to the constitutions described above, when the ECU 1 receives the communication signals, the communication signals superimposed on the supply voltage applied to the power line 10 is sent to the comparator part 3 via the bandpass filter 2. The ASK-modulated communication signals are amplified at the comparator part 3. The amplified communication signals are detected by the detection part 4 so as to be the received data. The received data are sent to the receiver part 5 and are processed with various processings.

On the other hand, when the ECU 1 transmits the communication signals, the transmission data generated by the receiver part 5 are sent to the modulation part 7. The transmission data sent to the modulation part 7 are ASK-modulated with the carrier oscillated by the carrier oscillator part 6 into the high frequency wave of several MHz band. The ASK-modulated transmission data are sent to the power line 10 via the output part 8 so as to be superimposed on the supply voltage and transmitted.

The supply voltage, for example a direct current voltage of 12 V, applied to the power line 10 is supplied to the power source circuit part 103 via the impedance element 9 and is changed into an operation voltage of electronic devices within the vehicle, 5V for example. The changed supply voltage is supplied to the respective electronic devices as a power source thereof. Further, the supply voltage applied to the power line 10 is supplied to the load control part 105 via the impedance element 9. When operating the load 107, the supply voltage supplied to the load control part 105 is supplied to the load 107 via the load control part 105 so that the load 107 is operated by means of the supplied voltage.

When the load 107 is operated, noise is generated at the load 107. For example, in a case where the load 107 is a motor, a brush noise is generated and is sent to the impedance element 9 via the load control part 105. However, the brush noise is attenuated by the impedance element 9 so that the noise flowing into the power line 10 is considerably reduced.

Figure 7:
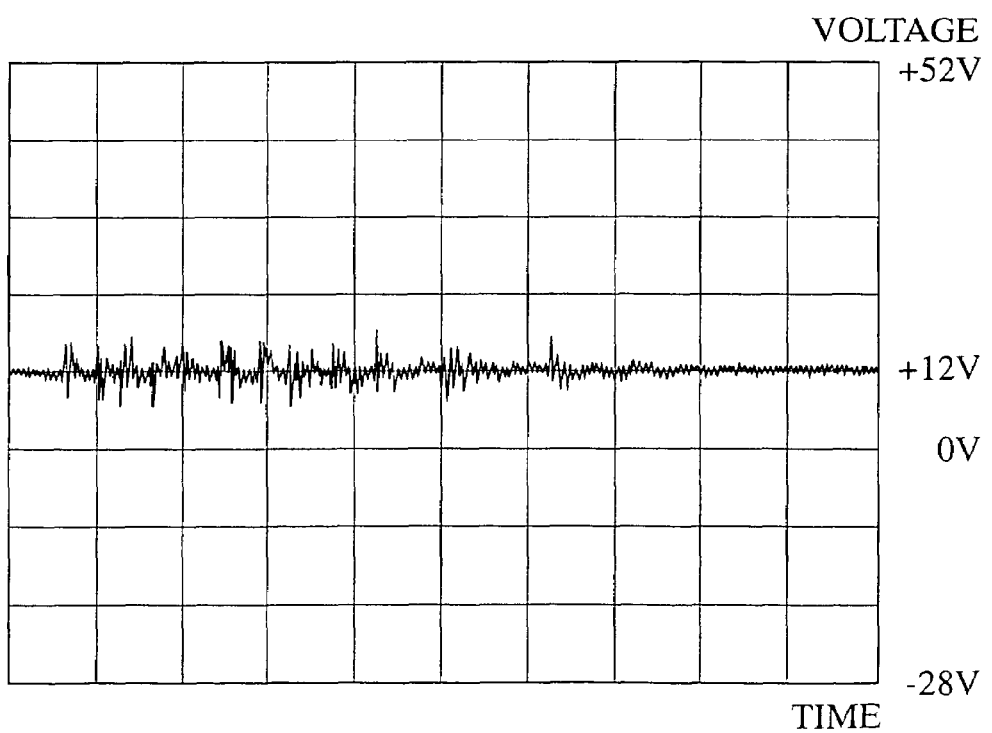
FIG. 7 is a practical example of the present invention of a supply voltage variation on a power line, in a case where a motor noise is superimposed thereon.

Assuming that the impedance element 9, the constitution of which is shown in FIG. 3, is applied and the load 107 is a motor for driving a side mirror of a vehicle, a noise level reaches about 40 V as shown in FIG. 5 when the motor is operated. In contrast, a noise level at the connection point N1 falls below 10 V by means of the noise reduction effect of the impedance element 9 as shown in FIG. 7. Thereby stable communication can be achieved and the communication quality is increased.

On the other hand, when operating the load 107, the load control part 105 is in a state of supplying the supply voltage on the power line 10 to the load 107. Consequently, the communication signals superimposed on the supply voltage flow into the load 107 via the load control part 105. In a case where the proposed PLC which is not provided with the impedance element 9, the communication signals are attenuated by the capacitor 109 for noise reduction provided at the load 107. According to the present invention, influx of the communication signals superimposed on the supply voltage into the load 107 is suppressed by the impedance element 9. Thereby the attenuation of the communication signals when operating the load 107 is suppressed.

Figure 8:
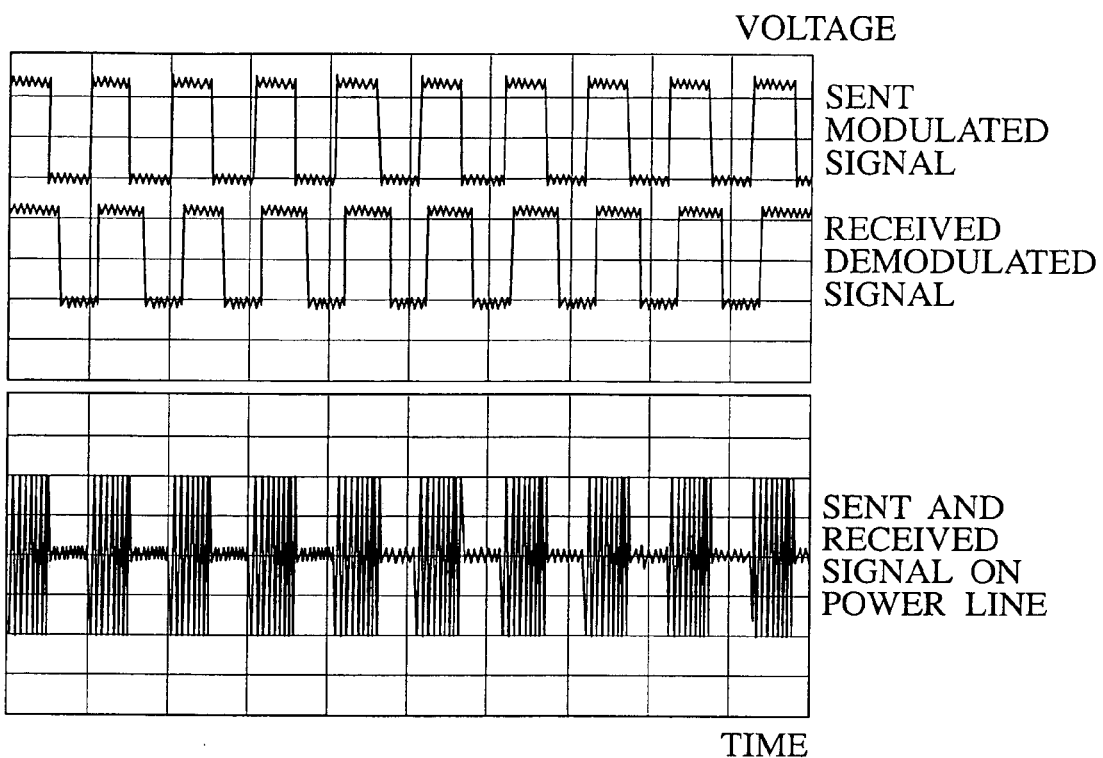
FIG. 8 shows a supply voltage variation on a power line, on which communication signals are superimposed, in a case where the motor is not driven.
Figure 9:
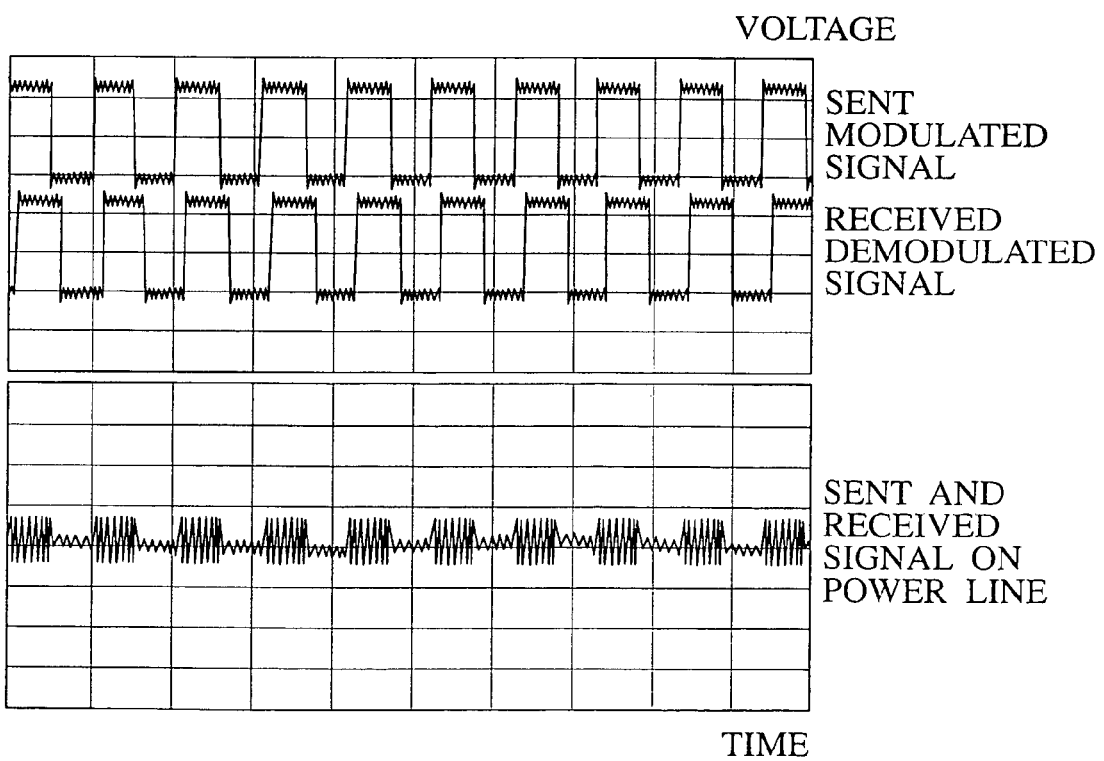
FIG. 9 shows a supply voltage variation according to the comparative example, in a case where the motor is driven.
Figure 10:
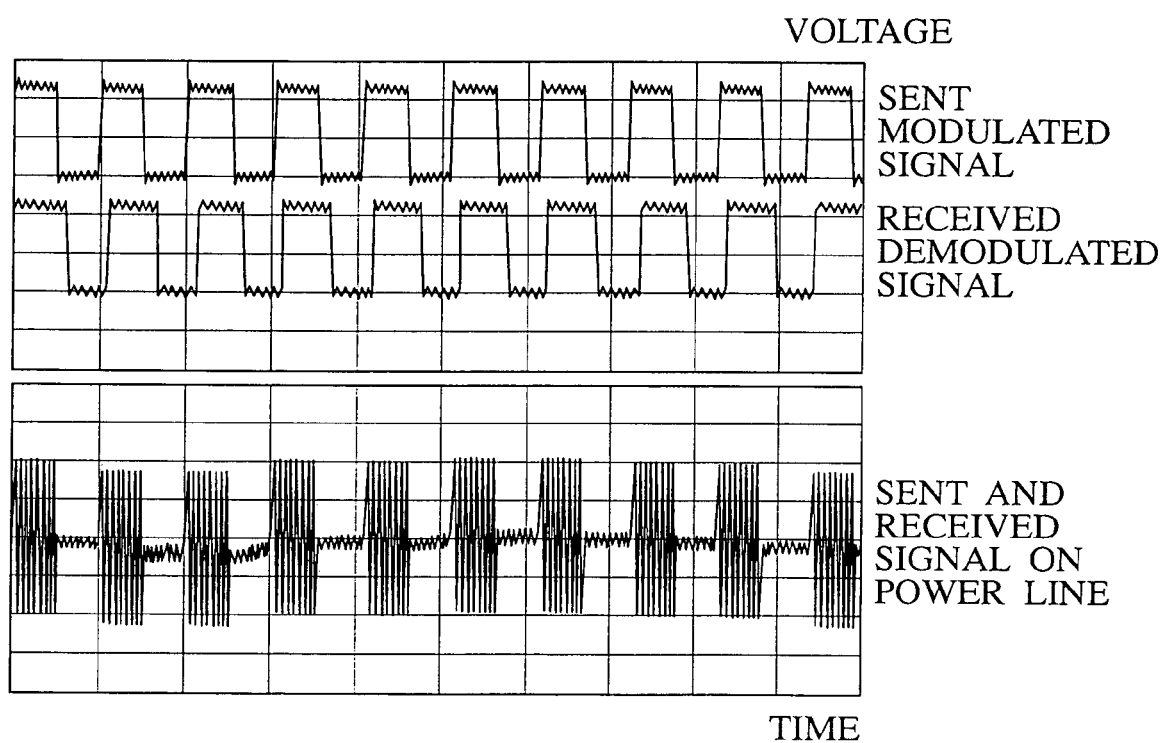
FIG. 10 shows a supply voltage variation according to an example of the present invention, in a case where the motor is driven.

Assuming that the impedance element 9, the constitution of which is shown in FIG. 4, is applied and the load 107 is a motor for driving a power window, a noise level is exemplified as in FIG. 8 when the motor is not operated. In a case where the proposed PLC which is not provided with the impedance element 9, the signal level is suppressed to about a quarter thereof as shown in FIG. 9. In contrast, in a case where the impedance element 9 is provided, a signal level is scarcely suppressed as shown in FIG. 10. Thereby attenuation of the signal level of the communication signals superimposed on the supply voltage is suppressed by means of providing the impedance element 9. Thereby stable communication can be achieved and the communication quality is increased.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A power line communication device for a vehicle, comprising:
    an internal electronic control unit connected to a connection point on a direct-current power line, the internal electronic control unit communicating with an external electronic control unit by a communication signal superimposed on a direct-current supply voltage applied to the direct-current power line;
    an impedance element configured to conduct a direct current to an external load and inserted between the connection point and the external load, and
    a load control part provided between the impedance element and the external load and within the internal electronic control unit, the load control part controlled by receiving control signals from the internal electronic control unit to switch on/off the direct current,
    wherein the impedance element has a higher impedance against a current component other than a direct current component.

2. The power line communication device of claim 1, wherein:
    the impedance element comprises a coil.

3. The power line communication device of claim 1, wherein:
    the impedance element comprises a coil and a capacitor connected in parallel with the coil.

4. The power line communication device of claim 1, wherein:
    the communication signal is amplitude-shift-key modulated.

5. The power line communication device of claim 1, wherein:
    the impedance element is configured to have higher impedance against non-direct current than against direct current.

6. The power line communication device of claim 1, wherein:
    the impedance element consists essentially of one or more coils connected in series between the connection point and the external load.

7. The power line communication device of claim 1, wherein:
    the impedance element consists essentially of one or more coils connected in series between the connection point and the external load, and one or more capacitors connected in parallel with the coils.

8. The power line communication device of claim 7, wherein:
    the capacitors are grounded.

9. The power line communication device of claim 1, wherein:
    the impedance element is further connected in series with an external power line communication device.

10. The power line communication device of claim 1, wherein:
    the load control part includes switching devices.

* * * * *